Patented Aug. 22, 1939

2,170,632

UNITED STATES PATENT OFFICE 2,170,632

COMPOSITION OF MATTER

Ralph T. K. Cornwell, Fredericksburg, Va., assignor to Sylvania Industrial Corporation, Fredericksburg, Va., a corporation of Virginia No Drawing. Application August 7, 1937,
Serial No. 157,935

14 Claims. (Cl. 134—79)

This invention relates to coating compositions and to plasticizers therefor and has as a general object the provision of novel and improved coating compositions.

A specific object of the invention is to provide a lacquer comprising a lacquer base and a plasticizing component which gives one a wider choice in the nature and proportions of the other lacquer ingredients.

Another object of the invention is to incorporate with lacquers, and like coating compositions, a fatty acid anhydride reaction product with benzophenone-2-carboxylic acid or a substitution product thereof, whereby novel and important properties are imparted to compositions and to films or coatings formed therefrom.

Other objects of the invention will in part be obvious and will in part appear hereinafter.

The invention accordingly comprises novel products possessing the characteristics, properties and the relation of constituents, all as exemplified in the following detailed disclosure and the scope of the application of which will be indicated in the claims.

In carrying out the invention, I employ a composition comprising generally a compatible mixture of a lacquer base, and a plasticizing composition comprising the reaction product of a fatty acid or fatty acid anhydride with a keto-benzoic acid, having the general formula

R—CO—R'—COOH wherein R and R' represent aromatic nuclei, or, more specifically, the reaction product of a fatty acid with a carboxylic acid of the benzophenone series or its substitution products, such, for example, as para-chlorobenzoyl-orthobenzoic acid, or its homologues such as toluyl-O-benzoic acid, all of which acids have the following general formula:

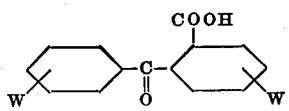

in which W represents a hydrogen or halogen atom, or an alkyl or aryl group. For the fatty acid reactant there may be employed any suitable straight chain aliphatic organic acids having the empirical formula $C_nH_{2n}O_2$, such, for example, as acetic, propionic, butyric, valeric, stearic acids and the like or their anhydrides, and it is to be understood that the expression "fatty acid", as used in the specification and claims, is intended to include the free fatty acids as well as the anhydrides thereof.

When larger amounts of plasticizer are desirable, the above compounds are to be used in admixture with other plasticizers as described hereinafter. I have found that the use of the relatively large amount of a plasticizing composition comprising a fatty acid reaction product with a keto-aromatic acid, more particularly, a carboxylic acid of the benzophenone series or a substitution product thereof, with or without an additional plasticizer enables me to form a moistureproofing composition by incorporating sufficient wax to give rise to a coating or film which is, at ordinary temperature, highly moistureproof, transparent, odorless, non-tacky and non-greasy and which is readily heat-sealable at temperatures of from 125° C. to 150° C.

By way of example, but not by way of limitation, the following illustration of a method making the plasticizer of the invention is given: 0.1 mole of o-benzoyl benzoic acid and 0.125 mole of acetic acid anhydride are dissolved in 300 cc. of xylene to which has been added one drop of concentrated sulphuric acid. The solution is boiled under a reflux condenser for three hours. On cooling the xylene solution, some of the acetyl derivative of o-benzoyl benzoic acid crystallizes out and the balance of the derivative may be obtained after concentration of the xylene solution. The crystals obtained may be purified in any suitable manner as by recrystallization to produce a product having a melting point of approximately 111–112° C. The other novel plasticizers which fall within the broad class herein disclosed may be produced in a like or in a similar manner to that just recited.

The reaction which occurs in the formation of the acetyl derivative according to the above illustration may be depicted as follows:

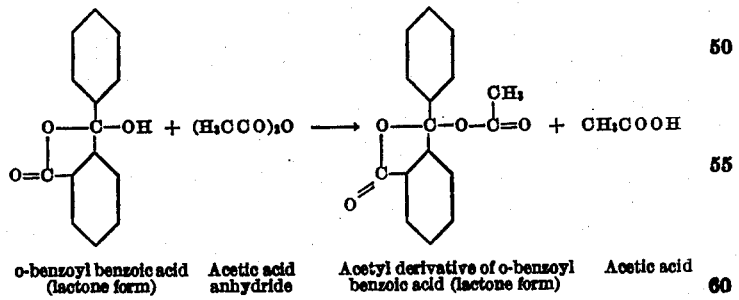

o-benzoyl benzoic acid   Acetic acid   Acetyl derivative of o-benzoyl   Acetic acid
(lactone form)   anhydride   benzoic acid (lactone form)

It is possible that the reaction product exists also in the ketone form so that the expression "reaction product" used in the specification and claims is intended to include the lactone or ketone form as well as mixtures thereof.

The plasticizers of the invention have the following formula:

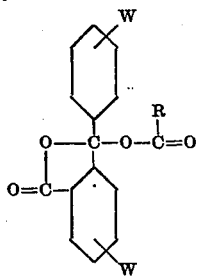

in which W represents a hydrogen or halogen atom, or an alkyl or aryl group and in which R represents an alkyl group or a chain of alkyl groups.

In general, the lacquer ingredients may be employed broadly within the approximate limits as follows, the percentages being by weight:

|  | Per cent |
|---|---|
| Lacquer base | 30 to 70 |
| Plasticizer: Reaction product of fatty acid with a keto aromatic acid | 5 to 20 |
| Additional plasticizer | 0 to 25 | to which may be added, if desired, one or more of the following:

|  | Per cent |
|---|---|
| Wax | 0.75 to 5 |
| Blown oil | Up to 5 |
| Gum or resin | Up to 50 |

The lacquer base comprises preferably nitrocellulose; however, it may comprise any suitable cellulose derivative, such as cellulose esters, cellulose ethers, cellulose ester-ethers or the like, and/or any suitable lacquer base resin, such as polymerized vinyl resins and the like as is well known to the art to which this invention appertains.

Suitable additional plasticizers for use with the acyl derivatives of the carboxylic acids of the benzophenone series are, for example, di-butyl phthalate, tri-phenyl phosphate, tri-cresyl phosphate and/or benzoyl-ortho-benzoic acid and esters thereof. The additional plasticizer is chosen in particular with regard to the properties it imparts to the film. With the reaction products of the fatty acid anhydride with the keto-aromatic acids of relatively high melting point, one may use an additional plasticizer of lower melting point than would otherwise be practical. For most purposes, such additional plasticizers as may be used should be preferably substantially odorless and colorless and compatible with the reaction product.

The total amount of the mixture of my novel plasticizer with additional plasticizers may be varied to give the desired flexibility without resulting in a tacky product and in general for moistureproof coatings or films containing wax and no gum or the like, the total amount of the plasticizing mixture should not be substantially less than about 25%. For a readily heat-sealable, as well as non-tacky, composition, the plasticizing mixture should comprise from about 35% to 40% and preferably about 40% by weight of the total solids used in the composition of which composition the plasticizers of the invention should comprise not substantially less than 10% by weight. If the heat-sealing property is not essential, the total amount of the plasticizing mixture may be reduced below the amounts given.

For the moistureproofing constituent any suitable animal, mineral or vegetable wax may be used, but I prefer to use a paraffin wax having a high melting point. The amount of wax may be so proportioned as to give the desired moistureproof value without greasiness. For readily heat-sealable as well as moistureproof coatings or films, the amount of wax should be preferably from about 0.75 to 3.5% by weight of the total solids. If desired, a blown oil such, for example, as blown rapeseed oil, may be used in the composition of this invention to render the wax compatible with the lacquer base.

As distinguished from the lacquer base resins, there may also be employed in the compositions of this invention suitable natural gums or resins such, for example, as dammar, ester gum, etc. and synthetic resins. For the production of readily heat-sealable compositions, the amount of such natural gums or resins should not substantially exceed about 15% by weight.

The invention will be explained in connection with the following tables of specific examples which are merely representative illustrations and which are in no sense intended to limit the invention to the exact details therein set forth. In the examples, all ingredients are expressed in percentages by weight.

There are given in the following table improved compositions which may be dispersed in suitable solvent mixtures and used as lacquers or coating compositions for wood, leather, paper, fabrics, etc. when moistureproofness per se is not required.

| Examples | 1 | 2 | 3 | 4 |
|---|---|---|---|---|
| Nitrocellulose, 5–6 sec | 70 | 70 | 60 | 60 |
| Fatty acid anhydride reaction product with a keto-aromatic acid | 30 | 20 | 15 | 10 |
| Di-butyl phthalate |  | 10 | 5 | 10 |
| Ester gum |  |  | 20 | 10 |
| Ethyl o-benzoyl-benzoate |  |  |  | 10 |

There are given in the following table improved compositions which are adapted to form coatings, films, sheets, etc., characterized by being highly moistureproof, transparent, flexible, non-greasy, non-tacky and readily heat-sealable at temperatures of from about 135° to 170° C.

| Examples | 4 | 5 | 6 | 7 |
|---|---|---|---|---|
| Nitrocellulose, 30 sec | 50 | 57 | 62.2 | 45.5 |
| Acetyl derivative of o-benzoyl benzoic acid | 26 |  | 10 | 8 |
| Propionyl derivative of o-benzoyl benzoic acid |  |  |  |  |
| Acetyl derivative or toluyl benzoic acid |  | 25 |  | 10 |
| Dibutyl phthalate |  |  | 5 | 10 |
| Ethyl o-benzoyl benzoate | 9.5 | 15 | 15 | 10 |
| Paraffin | 2 |  | 0.8 | 3 |
| Ozokerite |  |  | 0.5 |  |
| Spermaceti |  |  | 0.5 |  |
| Blown rapeseed oil | 2.5 | 1 |  | 0.5 |
| Resin (natural and/or synthetic) |  |  |  | 13 |
| Hydrogenated vegetable oil |  |  | 0.5 |  |

A lacquer may be prepared by taking up about 10 parts of one of the above compositions in about 150 to 250 parts of a suitable solvent such as, for example, one consisting of 15% ethyl acetate, 15% ·butyl acetate and 70% toluene. This may then be applied as a coating and dried in a heated dryer in the usual way, or formed into sheets or films, etc., if desired. When the composition contains wax, the solvent is preferably evaporated at an elevated temperature at least equal to the melting point of the wax in the composition.

These novel compositions may be used in a number of arts, but are particularly advantageous for moistureproofing wrapping materials such as Cellophane, cellulose esters and ethers, gelatine, casein, as well as glassine and the like, on account of the fact that they are transparent, non-greasy, non-tacky, odorless, give a high degree of moistureproofness and, when properly formulated, are readily heat-sealable at elevated temperatures in practical use. These novel compositions are further characterized by showing strong adherence to the wrapping materials above named.

In the manufacture of moistureproofing lacquers containing wax, the moistureproofness can be materially increased by the use of the presently contemplated plasticizers without the use of gum or other wax-blending agents and with the production of improved flexible, moistureproof, transparent, odorless, non-greasy and non-tacky products which are readily heat-sealable.

Some of the fatty acid anhydride reaction products with carboxylic acids of the benzophenone series, serving as novel plasticizing components of the present invention, are characterized by having relatively high melting points. This property, among others, permits the use of larger amounts of plasticizer in the production of non-tacky coatings, films and the like, and particularly when my novel plasticizers are used in properly proportioned mixtures with certain known plasticizers, the total amount may comprise as high as 40% of the solid components of the lacquer without tackiness. This permits the production of highly moistureproof coatings and films containing wax and which are readily heat-sealable in addition to having the other desirable characteristics above mentioned. Oils, resins and the like may also be used if desired for certain purposes.

I have found that if a film or sheet of Cellophane having a thickness of about one-thousandth of an inch, be coated, preferably on each side, with a moistureproofing composition approximately 1.5 ten thousandths of an inch thick, prepared in accordance with the present invention, the resistance of the coated sheet to the diffusion of water vapor is at least 50 times as great as that of the uncoated sheet of Cellophane when both are tested comparatively at a temperature of 40° C. The term "moistureproof" as used herein is intended to cover a composition having such a moistureproofing value when so tested.

It will thus be seen that by means of the present invention there have been provided novel moistureproofing compositions having improved and technically important properties which may be economically and easily prepared and used, and since certain changes may be made in the above mentioned products and different embodiments of the invention could be made without departing from the scope thereof, it is intended that all matter contained in the above description shall be interpreted as illustrative and not in a limited sense. It is also to be understood that in said claims ingredients recited in the singular are intended to include compatible mixtures of such ingredients wherever the sense permits.

Having described my invention, what I claim as new and desire to secure by Letters Patent is:

1. In a composition comprising a lacquer base, a plasticizer comprising the reaction product of a fatty acid with a mono-carboxylic keto-aromatic acid.

2. In a composition comprising a lacquer base, a plasticizer comprising the reaction product of a fatty acid with a mono-carboxylic acid of the benzophenone series.

3. A composition for preparing flexible and non-tacky coatings or films, comprising a compatible mixture of a lacquer base and the reaction product of a fatty acid with a carboxylic acid of the benzophenone series having the following general formula:

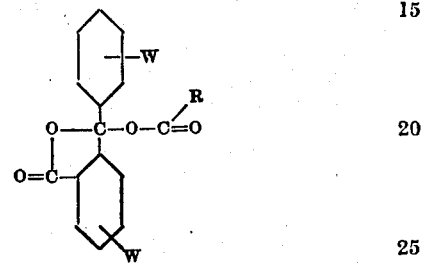

in which W represents a hydrogen or halogen atom or an alkyl or aryl group and in which R represents an alkyl group.

4. A composition for preparing flexible and non-tacky coatings or films, comprising a compatible mixture of a lacquer base and a plasticizing mixture, said plasticizing mixture comprising the reaction product of a fatty acid with a mono-carboxylic acid of the benzophenone series and an additional plasticizer with which said reaction product is compatible.

5. A composition for preparing flexible transparent and non-tacky coatings or films, comprising a compatible mixture of a cellulose derivative and the reaction product of a fatty acid with a mono-carboxylic acid of the benzophenone series.

6. A composition for preparing flexible transparent and non-tacky coatings or films, comprising a compatible mixture of from about 30% to 70% of a lacquer base and up to about 20% of the reaction product of a fatty acid with a mono-carboxylic acid of the benzophenone series.

7. A composition for preparing moistureproof flexible transparent and non-tacky coatings or films, comprising a compatible mixture of a lacquer base, wax and the reaction product of a fatty acid with a mono-carboxylic acid of the benzophenone series.

8. A composition for preparing moistureproof flexible transparent and non-tacky coatings or films, comprising a compatible mixture of a lacquer base, wax and a plasticizing mixture, said plasticizing mixture comprising the reaction product of a fatty acid with a mono-carboxylic acid of the benzophenone series and an additional plasticizer with which said reaction product is compatible.

9. A composition for preparing moistureproof flexible transparent and non-tacky coatings or films, comprising a compatible mixture of nitrocellulose, wax and the reaction product of a fatty acid with a mono-carboxylic acid of the benzophenone series.

10. A composition for preparing moistureproof flexible transparent and non-tacky coatings or films, comprising a compatible mixture of from about 30% to 70% of a lacquer base, of from about 2% to 6% of a wax, of from about 5% to 20% of the reaction product of a fatty acid with a mono-carboxylic acid of the benzophenone series and of from about 5% to 25% of a plasticizer with which the reaction product is compatible.

11. A composition for preparing moistureproof flexible transparent non-tacky and readily heat-sealable coatings or films, comprising a compatible mixture of a lacquer base, a wax and not substantially less than about 10% of the reaction product of a fatty acid with a mono-carboxylic acid of the benzophenone series.

12. A composition for preparing moistureproof flexible transparent non-tacky and readily heat-sealable coatings or films, comprising a compatible mixture of a lacquer base, a wax and from 10% to 20% of the reaction product of a fatty acid with a mono-carboxylic acid of the benzophenone series.

13. A composition for preparing moistureproof flexible transparent non-tacky and readily heat-sealable coatings or films, comprising a compatible mixture of a lacquer base, a wax, from about 25% to 40% of a plasticizing mixture, said plasticizing mixture comprising the reaction product of a fatty acid with a mono-carboxylic acid of the benzophenone series, and an additional plasticizer with which said reaction product is compatible.

14. A composition for preparing moistureproof flexible transparent non-tacky and readily heat-sealable coatings or films, comprising a compatible mixture of a lacquer base, a wax, a gum, from about 25% to 40% of a plasticizing mixture, said plasticizing mixture comprising the reaction product of a fatty acid with a mono-carboxylic acid of the benzophenone series, and an additional plasticizer with which said reaction product is compatible.

RALPH T. K. CORNWELL.